United States Patent [19]
Gilmore

[11] Patent Number: 6,144,112
[45] Date of Patent: Nov. 7, 2000

[54] FUEL PUMP IMMOBILIZATION

[75] Inventor: Paul Robert Gilmore, Essex, United Kingdom

[73] Assignee: Ford Global Technologies, Inc., Dearborn, Mich.

[21] Appl. No.: 09/417,607

[22] Filed: Oct. 14, 1999

[30] Foreign Application Priority Data

Oct. 15, 1998 [GB] United Kingdom .................... 9822394
Jul. 6, 1999 [EP] European Pat. Off. ............... 99305339

[51] Int. Cl.$^7$ .................................................. B60R 25/00
[52] U.S. Cl. .......................... 307/10.2; 307/9.1; 307/10.1
[58] Field of Search ..................................... 307/9.1, 10.1,
307/10.2, 10.3, 10.6; 180/287; 340/825.72,
425.5, 426, 825.3, 825.31, 825.32, 825.34,
825.44, 825.54, 825.69

[56] References Cited

U.S. PATENT DOCUMENTS 5,598,898 2/1997 Mutoh et al. ............................ 180/287
5,745,026 4/1998 Kokubu et al. ..................... 340/825.31
5,812,067 9/1998 Bergholz et al. .................. 340/825.31

*Primary Examiner*—Stephen W. Jackson
*Assistant Examiner*—Sharon Polk
*Attorney, Agent, or Firm*—Mark L. Mollon; Roger L. May

[57] ABSTRACT

The present invention relates to an apparatus and a method for a motor vehicle security system relating to immobilizing and enabling of a fuel pump for a motor vehicle engine. The system comprises data input means for receiving driver verification data, an engine control unit (ECU) including an ECU processor for controlling engine operation, a pump control unit (PCU) including a PCU processor for controlling the fuel pump, the PCU being separate from the ECU and integrally housed with the fuel pump. Communication links permit communication between the data input means and ECU, and between the ECU and PCU. The ECU processor is activated to control the PCU when valid driver verification data is received. The PCU processor is then activated to communicate a challenge code to the ECU. The ECU and PCU processors then compute respectively a first and a second response code associated with the challenge code. Finally, the PCU immobilizes the fuel pump until such time as the PCU receives from the ECU a first response code which matches the second response code computed by the PCU, whereupon the PCU is activated to control the fuel pump in response to the control of the ECU.

11 Claims, 3 Drawing Sheets

FUEL PUMP IMMOBILIZATION

TECHNICAL FIELD

The present invention relates to an apparatus and a method for a motor vehicle security system, and in particular a system and method relating to immobilizing and enabling of a fuel pump for a motor vehicle.

BACKGROUND ART

Motor vehicles such as motor cars are prone to theft. Many different systems have, therefore, been proposed to make motor vehicles more secure from theft. One popular approach is to use an engine immobilizer, which is a discrete device which cuts electrical power to essential components, such as a fuel pump, an engine control unit (ECU), or spark plugs, if a security device is not deactivated when a person enters the car. Many immobilizers, however, can be bypassed to restore power.

Another approach is to incorporate the functions of the immobilizer in the ECU, and to incorporate associated electronic circuitry in a fuel pump. The fuel pump circuitry has to receive a data signal from the ECU in order to activate the fuel pump to respond to control signals from the ECU. In this way, even if the ECU is bypassed to provide power to the fuel pump, the fuel pump will not work unless it has already received a valid activation code from the engine control unit. This improves security against vehicle theft, but unfortunately, if a thief knows the correct activation code for the fuel pump, the data line from the ECU to the pump can be bypassed, and a valid activation code supplied directly to the fuel pump. It is, therefore, possible for a thief to defeat such a vehicle security system.

DISCLOSURE OF INVENTION

It is an object of the present invention to provide a more secure motor vehicle security system.

Accordingly, the invention provides a motor vehicle engine immobilization system comprising data input means for receiving driver verification data, an engine control unit including a first processor means for controlling engine operation, a fuel pump for delivering fuel to the engine, a pump control unit including a second processor means for controlling the fuel pump, the pump control unit being separate from the engine control unit and integrally housed with the fuel pump, means by which the data input means may communicate with the engine control unit, and means by which the engine control unit may communicate with the pump control unit, characterized in that:

a) the first processor means is activated to control the engine including the pump control unit when valid driver verification data is communicated from the data input means to the engine control unit;

b) the second processor means is activated to communicate a challenge code to the engine control unit when the engine control unit has received valid driver verification data;

c) the first and second processor means are adapted to compute respectively a first and a second response code associated with the challenge code; and d) the pump control unit immobilizes the fuel pump until such time as the pump control unit receives from the engine control unit a first response code which matches the second response code computed by the pump control unit, whereupon the pump control unit is activated to control the fuel pump in response to the control of the engine control unit.

Also according to the invention, there is provided a method of enabling a fuel pump for delivering fuel to an engine in a motor vehicle, the vehicle comprising data input means for receiving driver verification data, an engine control unit including a first processor means for controlling engine operation, a pump control unit including a second processor means for controlling the fuel pump, the pump control unit being separate from the engine control unit and integrally housed with the fuel pump, means by which the data input means may communicate with the engine control unit, and means by which the engine control unit may communicate with the pump control unit, characterized in that the method includes:

a) entering driver verification data into the data input means;

b) communicating the data from the data input means to the engine control unit;

c) activating the first processor means to control the engine including the pump control unit when the driver verification data is valid;

d) activating the second processor means to communicate a challenge code to the engine control unit when the engine control unit has received valid driver verification data;

e) using the first processor means to compute a first response code associated with the challenge code;

f) using the second processor means to compute a second response code associated with the challenge code;

g) using the pump control unit to activate the fuel pump following receipt by the pump control unit from the engine control unit of the first response code if this matches the second response code computed by the pump control unit; or otherwise h) using the pump control unit to immobilize the fuel pump.

The engine management unit has vehicle security functions and is in this sense also a vehicle security controller.

The engine control unit, therefore, performs the initial authorization that permits a valid user of the motor vehicle to start the vehicle. In this initial stage, the engine control unit is in the position of a "master", and the pump control unit is in the position of a "slave". If the communication link between the engine control unit and pump control unit were completely secure, then this level of security authorization would be adequate and quite secure. However, it is possible for a thief to gain access to such communication link, in order to bypass the data input means and the engine control unit. With appropriate electronic devices and knowledge of the communication protocol, it is then possible for a thief to send the right activation signal to the pump control unit in order to start the fuel pump and, therefore, start the engine and drive the vehicle.

The invention, therefore, provides a second stage of security authorization, in which the pump control unit becomes the "master", and the engine control unit becomes the "slave". Unless the pump control unit receives the correct response from the engine control unit, it cannot be activated to run the fuel pump. Because the pump control unit is housed with the fuel pump, it is much more difficult and time consuming for a thief to break into any communication link or control lines between the pump control unit and the fuel pump. For example, in a fuel injection engine the fuel pump (including solenoid valves) and pump control unit may be integrated in a metal housing bolted to a side of the engine block. In other systems, the pump control unit may be inside a fuel tank with a fuel pump.

It would, therefore, be necessary for a thief either to disassemble or to replace the pump control unit and fuel pump, and in practice this could take a skilled person at least fifteen minutes to accomplish. However, even this would not in general be sufficient to start the motor vehicle unless the engine control unit were similarly bypassed.

Optionally, power supply means are provided by which electrical power may be switched on or off to the pump control unit. The first processor means can then control the power supply means to switch on the power when valid driver verification data is communicated from the data input means to the engine control unit. The act of switching on the power to the pump control unit may then automatically cause the second processor means to be activated to communicate the challenge code.

Alternatively, the engine control unit may communicate an activation code to the pump control unit when valid driver verification data is communicated from the data input means to the engine control unit. The second processor means is then activated upon receipt of this activation code to communicate the challenge code when the activation code is received by the pump control unit.

Preferably, the engine control unit has first nonvolatile memory, and the pump control unit has a second nonvolatile memory. The nonvolatile memories may, for example, be programmable read-only memories (PROMs), or flash memories. The challenge code can then contain encrypted data computed by the second processor means according to a challenge code algorithm using a variable random (which term includes psuedo-random) number, and a constant random number stored in the second nonvolatile memory. The variable random number may be generated by the pump control unit upon activation of the pump control unit by the engine control unit. The same constant random number is stored in the first nonvolatile memory allowing both the first and second processor means to compute respective first and second response codes according to the same response code algorithm, using the challenge code and the stored constant random number. Such algorithms may be effectively hidden in firmware from any thief attempting to reverse engineer the security system.

In a preferred embodiment of the invention, the constant random number is generated randomly by the second processor means the first time the second processor means is activated to communicate the challenge code to the engine management unit, the challenge code not being communicated until the constant random number is generated and communicated to the first processor means. Normally, this first time will be when the engine is first started after assembly of the vehicle on a production line.

BRIEF DESCRIPTION OF DRAWINGS

The invention will now be described in further detail, and by way of example, with reference to the accompanying drawings, in which.

BEST MODE FOR CARRYING OUT THE INVENTION

Figure 1:
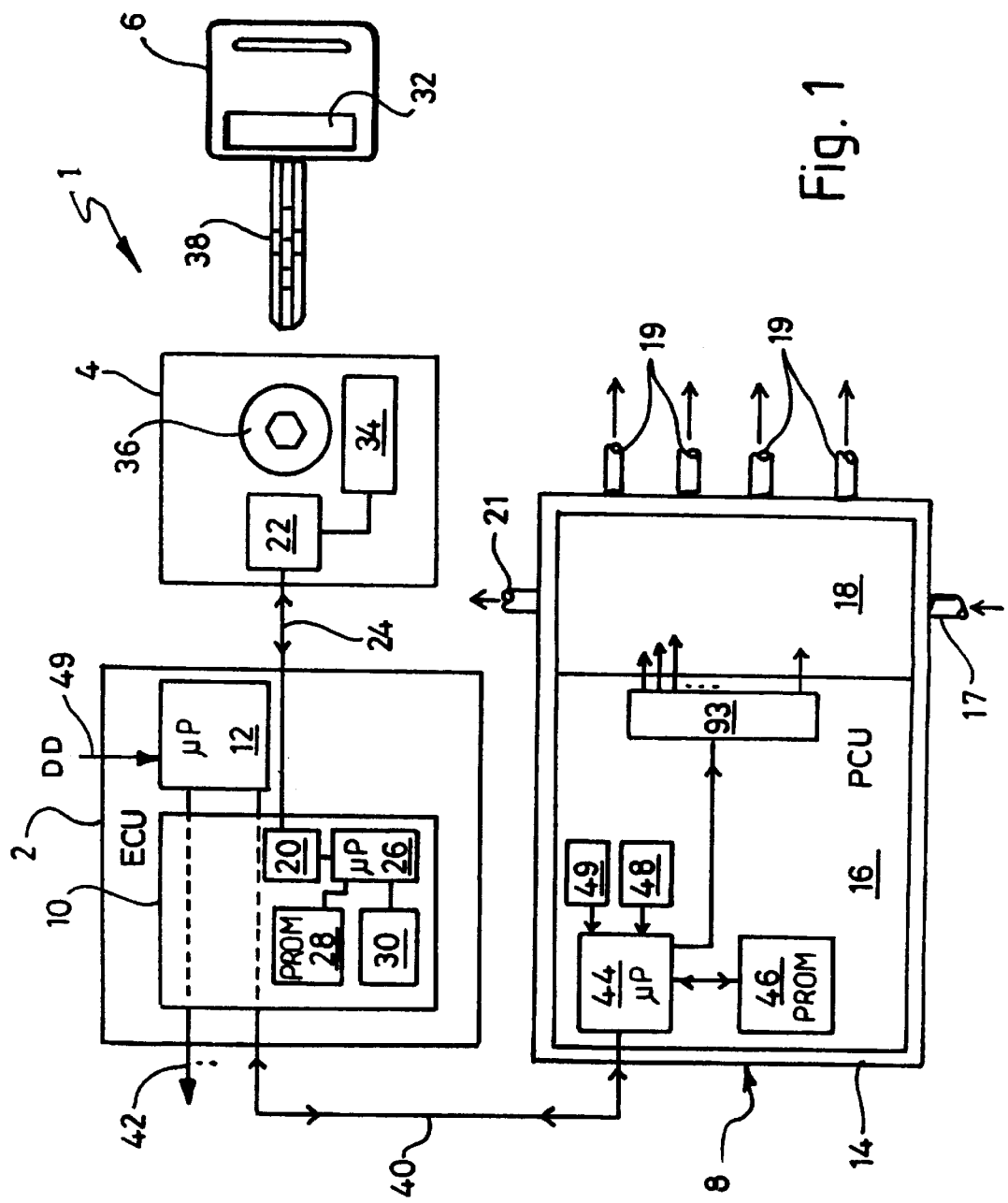
FIG. 1 is a schematic drawing of a motor vehicle engine immobilization system according to the invention.

Referring first to FIG. 1, the main components of an engine immobilization system 1 according to the invention are an engine control unit (ECU) 2, a key transceiver module 4, a security ignition key 6 and a fuel pump module 8. The engine control unit 2 includes a vehicle security controller 10, and a microprocessor ($\mu$P) 12 that controls overall engine operation. The vehicle security controller 10 is preferably integrally housed with the engine control unit 2. However, it would be possible for the two to be physically separate and connected by a suitable communication bus.

The fuel pump module includes a casing 14 which houses a pump control unit (PCU) 16 and a radial-piston distribution fuel injection pump 18. Fuel is supplied to the fuel pump 18 from a fuel tank (not shown) via a fuel inlet line 17, and has a number of outlet lines 19 by which fuel injectors (not shown) are supplied. Excess fuel is returned to the fuel tank by a fuel return line 21.

The fuel pump 18, and the hardware of the pump control unit 16 can be implemented using known and available components, such as from Bosch GmbH as respectively part numbers PG05 and VP30.

Together, the engine control unit 2, transceiver module 4, key 6 and fuel pump module 8 comprise the engine immobilization system 1. Similarly, the key transceiver module 4 and security key 6 comprise a data input arrangement for receiving driver verification data.

The operation of the engine immobilization system 1 in the absence of the fuel pump module 8 will be described first. The vehicle security controller 10 and the transceiver module 4 each have a communications interface 20,22 between which runs a security system bus 24, for example, a two-wire bus conforming to the ISO 9141 standard.

The vehicle security controller interface 20 is connected to a microprocessor ($\mu$P) 26 which is itself connected to at least one nonvolatile memory 28 such as a PROM, and a data verification unit 30. The data verification unit 30 may consist of discrete chips, or alternatively may be built into or programmed into the functioning of the engine control unit microprocessor 12.

The ignition key 6 also has a transceiver, referred to herein as a transponder 32. The internal components of the transponder 32 are not illustrated, but comprise a radio-frequency receiving-transmitting antenna, power storage capacitor, and a CMOS ASIC programmed with a security algorithm, all encapsulated within a glass cylinder.

The transceiver module 4 has a radio-frequency (rf) transmitter-receiver 34 in proximity with a lock mechanism 36. A shaft 38 of the key 6 is inserted into the lock 36 and turned to one of the three standard positions: accessory, run or start. The key 6 may or may not be cut to operate a tumbler mechanism within the lock, but in either case, as soon as the key is turned to or past the run position, the vehicle security controller 10 activates the key transceiver module 4 through the security bus 24.

The transceiver module's rf transmitter-receiver 34 generates an rf field, such as a field of 134.2 kHz for about 50 ms, which is received by the transponder 32 to charge the storage capacitor. The energy so received is used to generate a 64 bit security code plus bits containing a cyclic redundancy check (CRC) which is transmitted serially back to the transceiver 34 using frequency modulation at 134.2 kHz and 123.2 kHz.

The transceiver module 4 transmits the security code serially down the bus to the vehicle security controller 10. The vehicle security microprocessor 26 verifies first that the data is valid using the cyclic redundancy check, and then verifies that the data corresponds with data stored in the controller's nonvolatile memory 28. If the data is verified, then the security controller 10 sends a key status signal along a serial communication bus 40 to the pump control module 16 in order to activate or enable the pump control unit. Other essential motor vehicle components, such as an electronic ignition system, may be enabled on other lines 42. The key status signal is just a prompt signal, not a security signal. It is, therefore, possible for a thief to bypass communication between the engine control unit and send a false key status signal to the pump control unit.

Each key 6 may produce a unique security code, although in one implementation of the vehicle security system, a master key may be used to program new keys which may have a common or a different security code.

A vehicle security system as described above is known and has been implemented by the Ford Motor Company as the "passive anti-theft system" (PATS) for vehicle immobilization. In this known system, the fuel pump becomes enabled once the key status information is communicated. In the system according to the invention, however, the pump control unit 16 continues to immobilize the fuel pump 18.

Figure 2A:
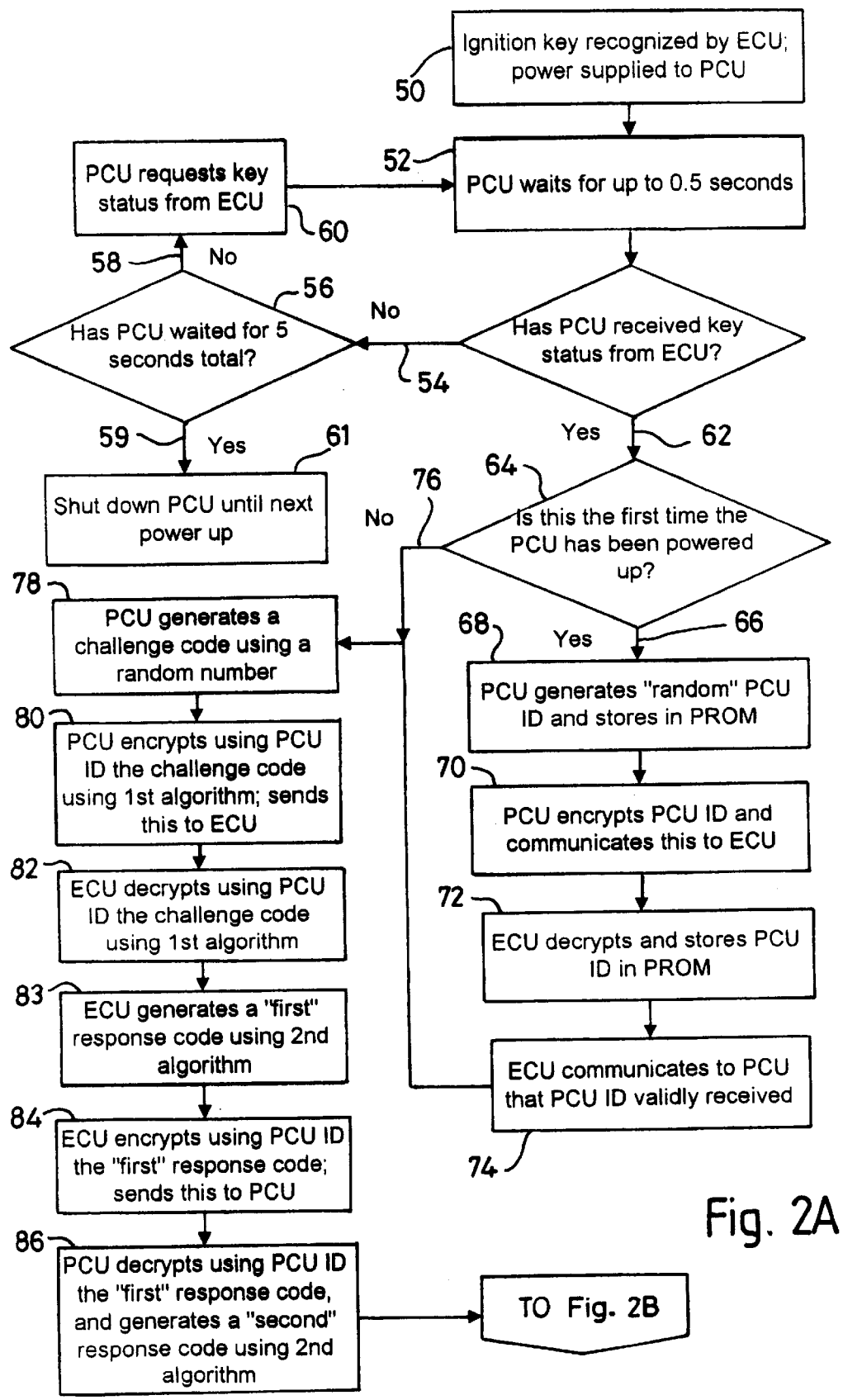
FIGS. 2A and 2B are flowcharts explaining further the system and the method according to the invention of enabling or immobilizing a fuel pump.
Figure 2B:
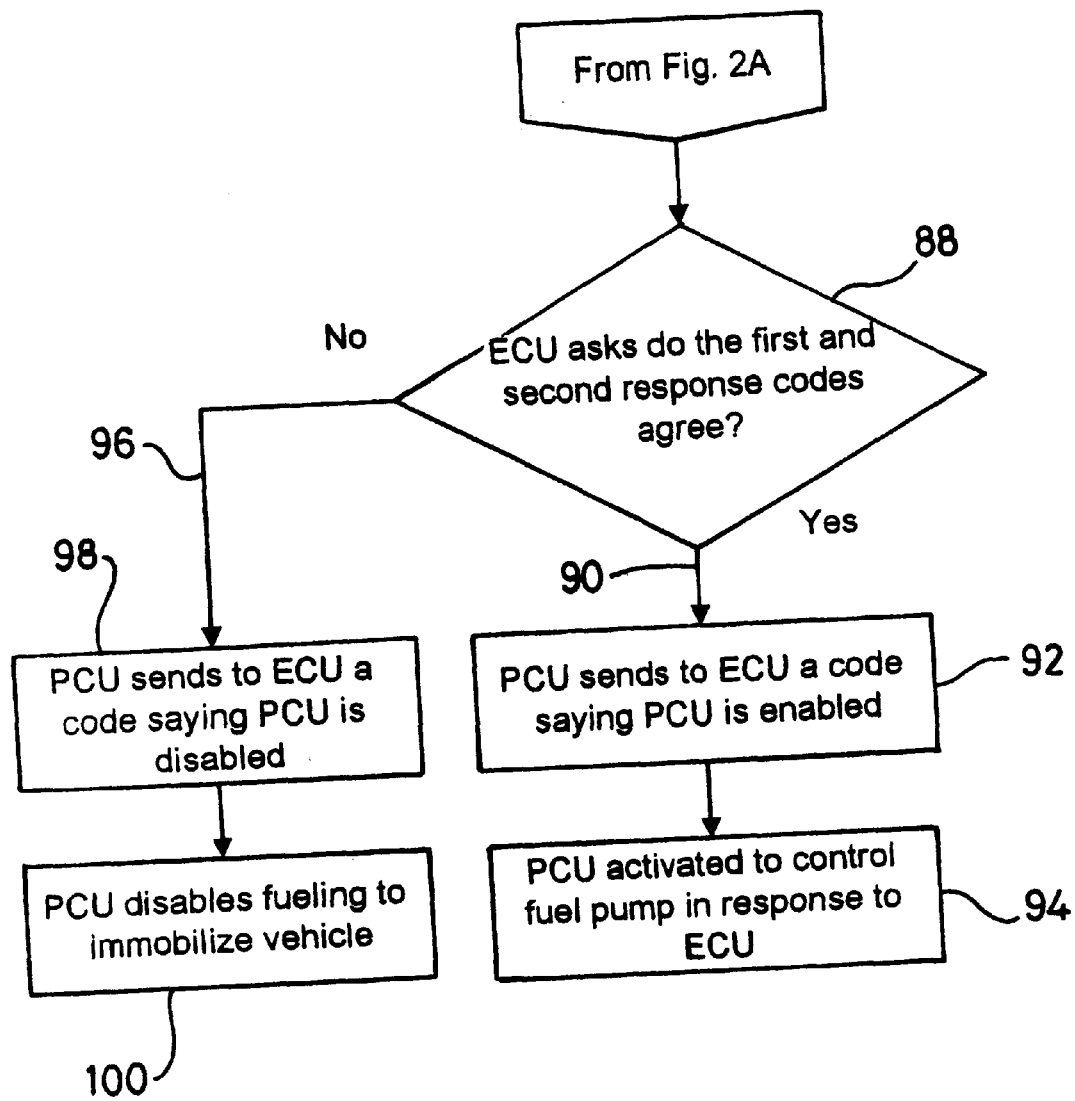

Reference is now made also to FIGS. 2A and 2B in considering in detail the interaction between the pump control unit 16 and the engine control unit 2. As described above, when the ignition key 6 is turned to start the engine, power is automatically supplied 50 to the pump control unit 16. This starts software running in a microprocessor ($\mu$P) 44 in the pump control unit 16, which then waits 52 for up to 0.5 seconds for the engine control unit 2 to send the key status signal. If no key status signal is received 54, then the pump control unit checks 56 first to see if the total wait time is 5 seconds or more. On the first pass, the wait time will be less than five seconds 58, in which case the pump control unit requests 60 key status information from the engine control unit 2 and then waits 52 for up to 0.5 seconds longer. If the software running in the pump control unit microprocessor 44 repeats this ten times, then the time elapsed will reach five seconds 59, in which case the pump control unit shuts itself down 61 until the next ignition power up 50.

When a key status signal is received 62 from the vehicle security controller 10 of the engine control unit 2, the pump control unit 16 checks 64 with a flag in a PROM memory 46 if this is the first time the pump control unit 16 has been powered up. If this is the first time 66, then the pump control unit microprocessor 44 generates 68 a pseudo-random number, referred to herein as a pump control unit identification number (PCU ID) using a well-known computer algorithm. An additional pseudo-random element may be introduced by using signals from an onboard fuel temperature sensor 48 and clock 49 as a random variables in the generation of the random number. Once generated, the microprocessor 44 stores the PCU ID in the pump control unit PROM 46.

The pump control unit then encrypts the PCU ID number according to an encryption protocol and communicates 70 this to the engine control unit 2. The vehicle security controller 10 then decrypts the PCU ID number according to the same protocol, and then stores 72 this number in the vehicle security controller PROM 28. Then the vehicle security controller 10 of the engine control unit communicates 74 to the pump control unit 16 that the PCU ID has been validly received. The pump control unit 16 then proceeds to generate a challenge code 78.

In the case that this is not the first time the pump control unit has been powered up 76, the pump control unit microprocessor 44 skips steps 68, 70, 72 and 74, and proceeds directly to generate the challenge code 78, by computing a psuedo-random number, in a similar manner to that described above.

The pump control unit microprocessor 44 then encrypts the random number using the PCU ID and a first algorithm to generate a challenge code and then communicates 80 this challenge code to the vehicle security controller 10 of the engine control unit 2. The vehicle security controller 10 recalls from the PROM 28 the same PCU ID and then decrypts the challenge code 82 according to the same first algorithm to regenerate the original random number. This same random number is then encrypted using a second algorithm to generate a first response code 83.

The vehicle security controller 10 then encrypts the first response code using the PCU ID and communicates 84 this to the pump control unit. The pump control unit microprocessor 44 then decrypts using the PCU ID the first response code, and also uses the same second algorithm to generate 86 a second response code corresponding to the challenge code. The pump control unit microprocessor 44 compares 88 the first and second response codes, and if these agree 90, the pump control unit 16 communicates to the vehicle security controller 10 of the engine control unit 2 a code saying that the pump control unit 16 is now enabled 92. The pump control unit 16 is then activated 94 to control the fuel pump 18 via a pump driver interface 93 in response to commands received from the engine control unit 2, for example, in response to a driver demand signal 49.

If the first and second response codes do not agree 96, then the pump control unit 16 communicates to the vehicle security controller 10 of the engine control unit 2 a code saying that the pump control unit 16 is now disabled 98. The pump control unit 16 is then disables fuelling 100 in order to immobilize the vehicle.

Because both the engine control unit 2 and pump control unit 16 store the PCU ID, if it ever becomes necessary to replace the pump control unit or engine control unit, it is also necessary to reprogram a new PCU ID. Although not illustrated, this can be done by a motor vehicle service center or dealer using appropriate diagnostic equipment according to a procedure that includes an access time delay sufficiently long that the delay would be a deterrent to any thief attempting unauthorized reprogramming. One example of a suitable procedure is as follows.

First the dealer would install a new pump control unit (or engine control unit) and plug the diagnostic equipment into a diagnostics port in the engine control unit. A diagnostic transmission would then be sent to the engine control unit to start a security access timer, which would then run for at least 10 minutes. After the time has elapsed, the diagnostic equipment would verify that security access has been granted by the engine control unit, which would then put the pump control unit in an "as new" state, for example, by setting a flag in an alterable nonvolatile memory, such as an E$^2$PROM. The next time the engine was powered up, software running in the pump control unit would perform the initialization sequence for the PCU ID as set out in steps 68, 70, 72 and 74 of FIG. 2A.

A particular advantage of the above-described invention is that it allows the designer of a motor vehicle security system to build upon existing motor vehicle security access systems having data input arrangements for receiving driver verification data, such as the above-mentioned PATS system. The invention also makes it possible to use existing hardware, such as known pump control units, that can then be modified with appropriate software and/or firmware.

Those skilled in the art will recognize that there are other ways to implement the communications between the data input means, the engine management system, vehicle security controller and pump control unit. In particular, the term "engine control unit" as used herein includes the case where the vehicle security controller is physically separate from other engine management hardware.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A motor vehicle engine immobilization system comprising:
    data input means for receiving driver verification data;
    an engine control unit including a first processor for controlling engine operation;
    a fuel pump for delivering fuel to the engine;
    a pump control unit including a second processor for controlling the fuel pump, the pump control unit being separate from the engine control unit and integrally housed with the fuel pump;
    means by which the data input means may communicate with the engine control unit; and
    means by which the engine control unit may communicate with the pump control unit, wherein:
    a) the first processor is arranged to be activated to control the engine including the pump control unit when valid driver verification data is communicated from the data input means to the engine control unit;
    b) the second processor is arranged to be activated to communicate a challenge code to the engine control unit when the engine control unit has received valid driver verification data;
    c) the first and second processors are further arranged to compute respectively a first and a second response code associated with the challenge code; and
    d) the pump control unit is arranged to immobilize the fuel pump until such time as the pump control unit receives from the engine control unit a first response code which matches the second response code computed by the pump control unit, whereupon the pump control unit is activated to control the fuel pump in response to the control of the engine control unit.

2. A motor vehicle engine immobilization system as claimed in claim 1, further comprising a power supply by which electrical power may be switched on or off to the pump control unit, in which the first processor is arranged to control the power supply to switch on the power when valid driver verification data is communicated from the data input means to the engine control unit, the second processor being activated to communicate the challenge code when the electrical power to the pump control unit is switched on.

3. A motor vehicle engine immobilization system as claimed in claim 1, in which the engine control unit is arranged to communicate an activation code to the pump control unit when valid driver verification data is communicated from the data input means to the engine control unit, the second processor then being activated to communicate the challenge code when the activation code is received by the pump control unit.

4. A motor vehicle engine immobilization system as claimed in claim 1 wherein the engine control unit comprises a first nonvolatile memory, and in the pump control unit comprises a second nonvolatile memory, wherein the challenge code contains encrypted data computed by the second processor according to a challenge code algorithm using a variable random number generated by the pump control unit upon activation of the pump control unit by the engine control unit and a constant random number stored in the second nonvolatile memory, the same constant random number being stored in the first nonvolatile memory.

5. A motor vehicle engine immobilization system as claimed in claim 4, in which the first and second processors are each arranged to compute the respective response codes according to a response code algorithm using the challenge code and the constant random number.

6. A motor vehicle engine immobilization system as claimed in claim 4, in which the constant random number is generated randomly by the second processor the first time the second processor is activated to communicate the challenge code to the engine control unit, the challenge code not being communicated until the constant random number is generated and communicated to the first processor.

7. A method of enabling a fuel pump for delivering fuel to an engine in a motor vehicle, the vehicle comprising data input means for receiving driver verification data, an engine control unit including a first processor for controlling engine operation, a pump control unit including a second processor for controlling the fuel pump, the pump control unit being separate from the engine control unit and integrally housed with the fuel pump, means by which the data input means may communicate with the engine control unit, and means by which the engine control unit may communicate with the pump control unit, the method comprising:
    a) entering driver verification data into the data input means;
    b) communicating the data from the data input means to the engine control unit;
    c) activating the first processor to control the engine including the pump control unit when the driver verification data is valid;
    d) activating the second processor to communicate a challenge code to the engine control unit when the engine control unit has received valid driver verification data;
    e) using the first processor means to compute a first response code associated with the challenge code;
    f) using the second processor to compute a second response code associated with the challenge code;
    g) using the pump control unit to activate the fuel pump following receipt by the pump control unit from the engine control unit of the first response code if this matches the second response code computed by the pump control unit; or otherwise
    h) using the pump control unit to immobilize the fuel pump.

8. The method of claim 7 further comprising using the first processor to switch on electrical power to the pump control unit when valid driver verification data is communicated from the data input means to the engine control unit; and
    performing f) only after power has been switched on to the pump control unit.

9. The method of claim 7 further comprising generating the challenge code according to a challenge code algorithm using a random number generated by the pump control unit.

10. The method of claim 9 wherein the pump control unit generates a variable random number, and the challenge code is generated based on the variable random number and a constant random number.

11. The method of claim 10 wherein the first and second processors use the constant random number to generate the respective response codes.

* * * * *